(12) United States Patent
Young

(10) Patent No.: US 6,591,252 B1
(45) Date of Patent: Jul. 8, 2003

(54) METHOD AND APPARATUS FOR AUTHENTICATING UNIQUE ITEMS

(76) Inventor: Steven R. Young, 7667 Chalkstone Dr., Dallas, TX (US) 75248

( * ) Notice: Subject to any disclaimer, the term of this patent is extended or adjusted under 35 U.S.C. 154(b) by 0 days.

(21) Appl. No.: 09/438,350

(22) Filed: Nov. 11, 1999

Related U.S. Application Data

(63) Continuation-in-part of application No. 09/262,535, filed on Mar. 4, 1999.

(51) Int. Cl.[7] .................................................. G06F 17/60
(52) U.S. Cl. ........................ 705/67; 705/72; 705/17; 705/58
(58) Field of Search .............................. 705/1, 10, 17, 705/27, 18, 67, 72, 57, 58; 380/200, 201, 202, 232, 270, 284, 54, 55; 283/86, 74, 70, 72, 67, 60.1; 713/200, 201

(56) References Cited

U.S. PATENT DOCUMENTS 5,267,756 A * 12/1993 Molee et al. ................. 283/86
5,971,435 A * 10/1999 DiCesare et al. ............. 283/70
6,069,955 A * 5/2000 Coppersmith et al. ........ 380/54

FOREIGN PATENT DOCUMENTS

JP    404299409 A  * 10/1992

OTHER PUBLICATIONS

Transform Permuted Watermarking for copyright Protection of Digital Video; IEEE Globecom 1998; p. 684–9 vol. 2.*

* cited by examiner

Primary Examiner—Pierre E. Elisca
(74) Attorney, Agent, or Firm—Jones Day

(57) ABSTRACT

A method and apparatus for authenticating, archiving information and updating ownership of unique items by associating a unique identifying code with the item. Ownership history of the item is locked with a PIN or Personal Identification Number of the owner and cannot be changed until the owner releases the PIN. A new owner then associates his PIN with the item.

20 Claims, 1 Drawing Sheet

METHOD AND APPARATUS FOR AUTHENTICATING UNIQUE ITEMS

CROSS-REFERENCES TO RELATED APPLICATIONS

This is a continuation-in-part application of Ser. No. 09/262,535 filed Mar. 4, 1999, and having the same inventor as the present application.

BACKGROUND OF THE INVENTION

1. Field of the Invention

The present invention relates in general to a method and apparatus for authenticating one-of-a-kind, or one-of-a limited number of collectibles, memorabilia, or other unique items and in particular to a method and apparatus for registering, authenticating, and archiving data representing one-of-a-kind or one-of-a limited number of unique items and/or memorabilia. Archived data particularly includes ownership history.

2. Description of Related Art Including Information Disclosed Under 37 CFR 1.97 And 1.98

There is an enormous market for one-of-a-kind or one-of-a limited number of memorabilia or collectibles, hereinafter referred to as unique items.

"Memorabilia" as defined by Webster (and as used herein) means "Things worth remembering, gathered as a hobby." This terminology encompasses an unlimited number of categories, including but not limited to, trading cards, sports apparel and equipment, dolls, plates, die cast products, paintings, and the like.

Further, the term "aftermarket", as used herein, means the established venue for the reselling of any item (beyond original purchase) by collectors/investors. As stated earlier, there is an enormous market for such unique items. For instance, well-known companies such as the Franklin Mint will produce a limited number of some type of memorabilia such as plates, statutes, pictures, and the like. Each of these items may be sold as "one of n" number of such items and the number of the item is printed on or associated with the item or memorabilia. As an example, if a limited edition of a thousand prints of a particular picture are produced and numbered, the sequential notation on each one will read "1 of 1000, 2 of 1000, 3 of 1000, . . . 1000 of 1000".

In addition, trading cards for almost every conceivable subject exists. Particularly, trading cards are a large market in the sports field. There are limited editions of pictures of various athletes in various fields of sport, such as football, baseball, basketball, and the like. Some of these pictures have great value because they are printed in limited numbers.

In addition, a celebrity (sports, movies, music, etc.) or sometimes a group of celebrities will hold an autograph session where they will sign almost any item a fan or collector puts in front of them. It is not unusual for a business to enter a contract with the celebrity(s) where, for a fee, they will sign a limited number of items either provided by the business or brought to the signing location by the fan. Since such autographed item often has great value it, would also be desirable to register and archive the details surrounding such an autographed item.

Several concerns exist with this type of unique collectible item. First, if you purchase one of such unique items from a dealer, another person, or from any other source and it states that this item is number "2 of 1000", there is no way to know (1) if the object or item is the real item or if it is a forgery, (2) whether all items or memorabilia in the set have been sold (i.e., 1000 out of 1000 or just 5 out of 1000), (3) the approximate value of the items or memorabilia without knowing the answer to (1) and (2) above, or (4) even if the item is clearly authentic, is the seller the true owner or authorized agent or was the item stolen.

Thus, it would be advantageous to have a method and system for registering, authenticating, and archiving relevant and accurate data associated with each unique item, or one of a limited number item especially if the system is credible and not easily corrupted by fraudulent intent or by error. According to the present invention, when one of the unique items or memorabilia is purchased, encoded data associated therewith is sent to the authenticating system or central clearing house where it is compared with the data registered and archived therein for that particular unique item or memorabilia. From such data or information it can be determined if the item is a genuine one-of-a-kind or one-of-a limited number item or whether it is a forgery or fake. One can also determine the number of the memorabilia in a set that has been sold and archived and, thus, have an idea of the value of the memorabilia just purchased. In addition, the ownership history of each archived item can be tracked and reviewed if desired.

SUMMARY OF THE INVENTION

The present invention provides an authentication system or "central clearing house" that receives uniquely coded identifying data from an owner or manufacturer representing a unique item, including autographed items or individual ones of a particular set of collectibles or memorabilia. The uniquely coded identification data is also attached to or associated with each of the unique items in some manner. For instance, a magnetic strip containing the encoded identifying data as well as a manufacturer's code may be placed on individual cards, or a bar code containing the encoded data and the manufacturer's identifying data may be placed on a one-of-a-kind object. Alternatively, either a bar code or a magnetic strip may be placed on a tag, card, or other item associated with or attached to each of the one-of-a-kind or one of a limited number unique items for identifying the same. In addition, secure personal information specifically related to the manufacturer or owner such as a PIN or personal identification number may also be associated with each unique item.

Thus, the owner, manufacturer of the unique items or items, or business hosting an autograph session may send the encoded data representing each individual item along with the secure personal identification number to the authentication system or to a central clearing house for such purposes as registering, archiving, authentication, ownership tracking and buying or selling.

According to one embodiment, when the product is originally sold or about to be sold or authenticated, the purchaser may contact the authentication system or central clearing house of this invention and provide the uniquely coded identification of the one-of-a limited number or unique item. This may be done by any suitable manner such as, keying in by computer or touch tone telephone or even by reading (such as by a Veriphone) a bar code or magnetic strip located on the item or a tag associated with the item. At this time or at any point during communications with the authentication system of this invention, selected purchaser information could also be added to the encoded data to form combined data. The combined data (purchaser data plus unique object identification) can then be compared with the registered and archived encoded data for that particular unique item and an authentication signal or non-authentication signal is then provided by the authentication system or central clearing house.

In addition, the authentication system of this invention is equally effective for use with the after market or subsequent sale of unique items already registered and archived in the system. That is, a seller and buyer both having access to the authentication system of this invention may carry out a transaction by providing encoded personal security information in addition to the encoded data representation of the unique item. After the process is complete, the buyer will then be registered in the system as the new owner and will have control over any future change in the recorded or registered ownership data related to the item. In a preferred embodiment, a fee will be required by the authentication system before a change in the registered ownership is effected. Typically, a copy of the transaction will be provided at least to the buyer indicating that he is now the registered owner of the item. Preferably, a copy of the transaction will also be provided to the seller. Selected details of the transaction such as the name of the buyer and seller and the transaction date are then a part of the archived information such that a complete record of the ownership history of the item is available for review no matter how many past sales have been made.

According to one embodiment of the invention, updating registered ownership of the unique items from a present registered owner to a subsequent registered owner by the authentication system may proceed as follows. To update or record the new registered ownership of a unique item which has previously been registered and archived by the authentication system, it will be recalled that secure personal information associated with the manufacturer or present owner (such as a confidential PIN or Personal Identification Number) was also associated with each unique item so as to "lock" information defining the ownership of the item. Thus, the information cannot be changed or updated unless the confidential PIN is provided along with a request for such a change. In a preferred embodiment, once the present owner has agreed to a sale or has completed negotiations for a sale of the item, he contacts the authentication system and releases or disassociates his PIN or Personal Identification Number from that item. Typically, this would occur after the present owner has received the required payment or a promise to pay, etc. The new or subsequent owner then accesses the authentication system and calls up the unique item by providing the unique encoded data which is associated solely with the item. The new owner then provides new registered ownership identifying information along with his own PIN or Personal Identification Number to the authentication system so that his PIN is now associated with the item and the information is again locked. The locked information cannot be changed until the new registered owner releases or disassociates his PIN from the item. According to a preferred embodiment, such registering of a new subsequent owner is accomplished by the present (or old) owner and the potential (or new) owner accessing a website associated with the authentication system.

As discussed, the authentication system or central clearing house may have a computer website to which access may be had by the manufacturer, buyers and sellers, and, or course, the authentication system.

Thus, any registered unique item may be placed on the website for viewing by website users. Should a website user find a one-of-a-kind memorabilia or unique item that he wishes to purchase, then, according to one embodiment, he may respond to the website inquiring about that particular one-of-a-kind memorabilia. The authentication system or central clearing house can then contact either the purchaser directly or the participating site to inquire if the object is for sale and for what price. The central clearing house would then be an agent for the seller.

Alternatively, as was discussed above, when the buyer and seller both have access to the authentication system, they may carry out all negotiation and financial transactions directly and in private and only use the system for authentication and new owner registration.

Thus it is an object of the present invention to provide an authentication system or clearing house where authentication of a purchased unique item such as memorabilia or one of a limited number may be obtained.

It is also an object of the present invention to provide a method and system in which each unique item has a unique identification code associated with it and all of the codes for all such items are recorded and archived in the central clearing house.

It is a further object of the present invention for providing a system comprising a seller's or manufacturer's code which uniquely identifies a unique item with the code attached to a purchased item or items for sale to authenticate the unique item.

It is also an object of the present invention to enable the data recorded and archived in the central clearing house to be posted on a computer website for access by website users thereby enabling website users to shop for unique items that are recorded and archived.

Thus, the present invention relates to a method of authenticating ownership of unique items such as one-of-a-kind memorabilia, including autographed items that is available for purchase comprising the steps of associating coded data with each individual unique item that uniquely identifies the unique item; registering and archiving the data uniquely identifying the unique item in a central clearing house or authentication system; and authenticating a purchase of the unique item by comparing the uniquely encoded data associated with the purchased item with registered uniquely coded data in the authentication system or central clearing house corresponding to the purchased unique item.

The invention also relates to a system for registering, authenticating, and archiving unique items comprising associating encoded data with each unique item for uniquely identifying each unique item; a central clearing house or authentication system for receiving the encoded data representing the unique item; a consumer site or website for providing the encoded data uniquely identifying each unique item to the authentication system; selected purchaser information being added to the uniquely encoded data to form combined data to be sent to the authentication system or central clearing house; and a comparator in the authentication system for authenticating the purchased unique item by comparing at least a portion of the stored combined data in the central clearing house with the unique identifying code associated with the purchased item.

The system also relates to a system and method for authenticating the sale of a previously registered unique item and for archiving and registering a new authentic owner of the unique item.

For example, the authentication system of the invention is effective for use with the after market or subsequent sales of unique items already registered and archived in the system. That is, a seller and buyer who have access to the authentication system of this invention, may carry out a transaction by providing encoded personal security information in addition to the encoded data representative of the unique item. The buyer will then be registered in the system as the new owner and will have control over any future change in the recorded or registered ownership of the item. In a preferred embodiment, a fee will be required by the authentication system before a change in the registered ownership is effected. Typically, a copy of the transaction will be provided at least to the buyer indicating that he is now the registered owner of the item. Selected details of the transaction, such as the name of the buyer and seller and the transaction date are then a part of the archived information such that a complete record of the ownership of the item is available for review no matter how many past sales have been made.

The process of updating registered ownership of the unique items from a present registered owner to a subsequent registered owner by the authentication system would typically proceed as follows. To update or record the new registered ownership of a unique item which has previously been registered and archived by the authentication system, second unique data associated with the present owner such as a confidential PIN or Personal Identification Number, is also associated with the unique item so as to prevent any change to information defining the ownership of the item unless the confidential PIN is provided along with a request for such a change. In a preferred embodiment, once the present owner is satisfied with the condition of a sale of the item, he contacts the authentication system an releases or disassociates his PIN from that item. Typically this would occur after the present owner has received the required payment or a promise to pay, etc. The new or subsequent owner then accesses the authentication system and calls up the unique item by providing the unique encoded data which is associated solely with the item. The new owner then provides ownership identifying information and his own PIN to the authentication system so that his PIN is now associated with the item and the information is again locked. In a preferred embodiment, before the system will effect and record the ownership change, the new owner will be required to pay a recording fee. This may be accomplished in many known ways, including posting a charge to an account or authorizing payment by a credit card, etc. The locked information cannot be changed until the now registered owner releases or disassociates his PIN from the item. Accordingly, to a preferred embodiment, such registering of a new subsequent owner is accomplished by the present (or old) owner and the potential (or new) owner accessing a website associated with the authentication system.

BRIEF DESCRIPTION OF THE DRAWINGS

These and other features of the present invention will be more fully disclosed when taken in conjunction with the following Detailed Description of the Preferred Embodiment(s) in which like numerals represent like elements and in which.

DETAILED DESCRIPTION OF THE PREFERRED EMBODIMENT(S)

Figure 1:
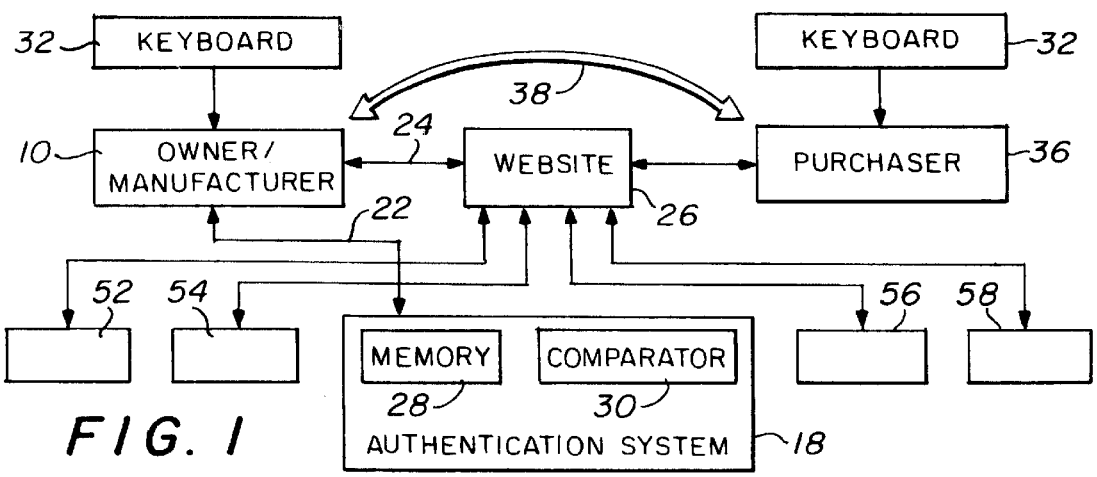
FIG. 1 is a block diagram of the apparatus of the present invention.
Figure 2:
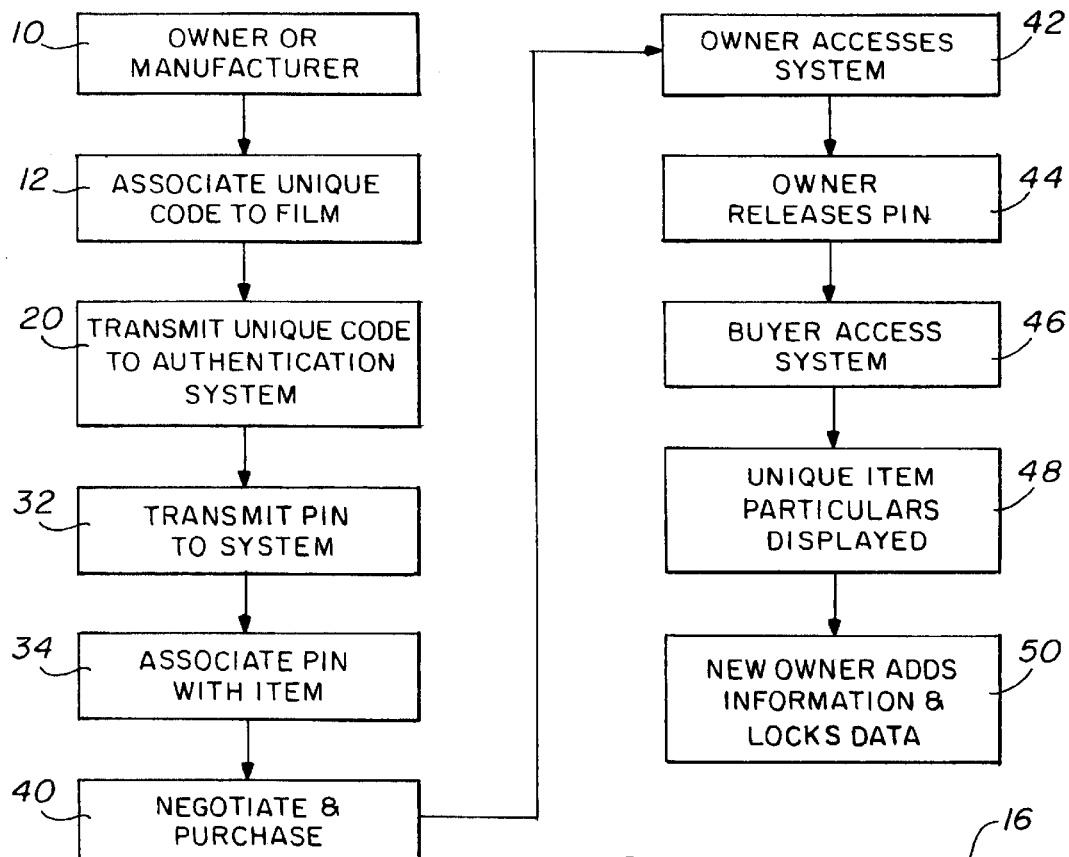
FIG. 2 is a block diagram showing the method of registering and recording a new owner of a unique item according to the present invention.

FIG. 1 is a block diagram that illustrates the general concept of the present invention, and FIG. 2 is a flow diagram illustrating the steps of the present invention. FIGS. 1 and 2 should both be referred to in the following discussion. A manufacturer 10 produces a "one-of-a-kind" memorabilia such as a limited edition of books, pictures, paintings, trading cards such as baseball cards, football cards, basketball cards, or the like.

Figure 3:
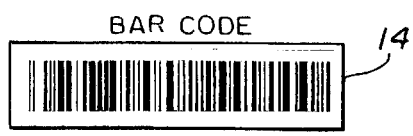
FIG. 3 illustrates a bar code that can be associated with each memorabilia and containing a unique identifying code for that particular memorabilia.
Figure 4:
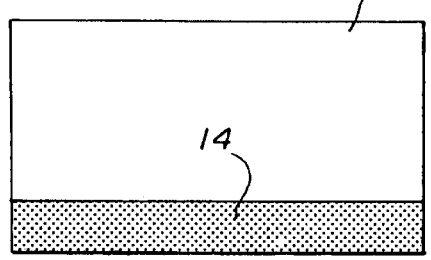
FIG. 4 illustrates a magnetic strip that can be associated with a card-type object for containing a unique code identifying that object.

Alternatively, an owner 10 of a single unique item will choose to take advantage of the advantages of the authentication system of the present invention. The manufacturer of the memorabilia or owner 10 of the unique item associates with each item he wishes to register and record a unique identification code that identifies that particular item as shown in step 12 of FIG. 2. In the case of one-of-a limited number memorabilia, the unique identification code will also typically identify the manufacturer. For instance, if the memorabilia is a set of only 1000 prints of a picture, and each of the prints is numbered as, for instance, 1/1000, 2/1000, 3/1000, . . . 1000/1000, the unique identifying code would identify the second memorabilia as 2 out of 1000 and it would include the manufacturer's name. Thus, each unique item is uniquely identified with a code that is associated with it. According to one embodiment, the unique code is preferably included in a well-known bar code 17 as in FIG. 3 or in a magnetic strip 14 on a card 16 as shown in FIG. 4.

In a similar manner, a business may contract with a celebrity or a group of celebrities (such as a sports team) that for an agreed fee the celebrity(s) will autograph a fixed number of items. The business may choose to require the fan to purchase the item to be signed from the business or for a fee (or free) may allow the fans to bring their own items to be autographed.

The business would then provide a tag-label or card which would then be attached, secured to or otherwise associated with the autographed item. As an example, the fan would take the item to the celebrity to obtain an autograph and then go to a representative of the business who would complete the card or tab-label with factual and identifying information, such as description of the item, the date and circumstances of the autograph and perhaps even which numbered signature (i.e., 1 of 200, 2 of 200 . . . 200 of 200) etc. Of course, the tag-label or card would also include a unique identification code as was the case for one of a limited number memorabilia. According to one embodiment, the tag-label or card may also include a peel-off label and which includes at least the unique identifying code and which can then be attached to the unique item.

An example of a business owner or manufacturer's code which could be placed on each item or on an accompanying "tag-label" follows. A desired format would include a category, the manufacturer, a product code and an alphanumeric authentication code. Thus, if a manufacturer of sports trading cards were to issue a new set of cards, the code could be as follows: TC-TOP-L499-XY4TW. The "TC" represents a trading card as the category; "TOP" represents the manufacturer; "L499" is the product code; and "XY4TW" is a random generated alphanumeric code. Using this format, sequential series of numbers for trading cards could be as example only:

026 of 200 TC-TOP-L499-SVL6C
027 of 200 TC-TOP-L499-BDFM7
028 of 200 TC-TOP-L499-WHQNJ (etc.)

From this example it is seen that the item number of a limited number is sequential, the category, manufacturer and product code is constant, and the alphanumeric authentication code is unique to the serial number and may preferably be randomly created by a computer.

For each item in a limited number of items the unique alphanumeric authentication portion of the code should be obscured by the packaging or tamper-proof removable seal or latex scratch-off material.

For a simple one-of-a-kind unique item such as for example on an autographed baseball bat, a tag with identifying and historical information would be attached to the bat which could read as follows:

| Manufacturer: | "X" Company |
|---|---|
| Autograph: | John Smith |
| Year of Issue: | 1999 |
| Comment: | John Smith used this bat to hit his 43rd home run on 9/12/99 |
| 1 of 1 | UNIQUE CODE |

The "unique code" is preferably obscured from view.

Alternatively, the unique code may simply be a secure alphanumerical code which can be provided via a computer keyboard. The manufacturer or owner of the unique item must then transmit the unique code of the item or items to the authentication system 18 as shown in FIG. 1. Block 20 shows this step in FIG. 2. This information may be transmitted along line 22 as shown in FIG. 1, or any other secure channel such as along modem line 24 to a website 26 set up for the authentication system 18 as will be discussed later. Thus, the authentication system will store and archive all of the unique codes representing unique items or one of a limited number memorabilia in a given set in a memory 28.

To use the website 26 as the communication channel for buying and selling registered items, the owner of the unique item can become a participating member of the authentication system of this invention by paying a fee and registering with the system at which time he receives a PIN or Personal Identification Number which is used for accessing the system and carrying on transactions. A registered participating member can then "visit" the website 26 associated with the authentication system of this invention and provide his PIN and the code unique to the specific item through a computer keyboard 32. The unique identifying code or data is transferred through line 24 in the case of website access to the authentication system 14. As mentioned, system 18 has a computer system with bulk memory storage 28 for storing information related to the requested items, and a comparator 30 as a part thereof or is associated therewith. As will be discussed later, in the event of an original sale or an after market sale, the comparator 30 can then compare the identifying code on the unique item to be sold with the recorded, archived and stored data in the central clearing house. If there is a match, the archived data associated with the unique item is retrieved for review and/or revision upon completion of a sale. Of course, the data can be coupled back to the manufacturer, the buyer, the purchaser, a perspective buyer or other interested party, or wherever desired.

In this manner, a complete record is kept of the one of a limited number or autographed memorabilia, including the manufacturer, the number of memorabilia in a set, the number purchased and the present owner. Thus, the purchaser may review complete details on the one-of-a-kind memorabilia that would enable him to generally realize the value of the one-of-a-kind memorabilia that was purchased. In addition, of course, the complete ownership history of the item can also be tracked.

As can be seen in FIG. 1 and the flow diagram of FIG. 2, the manufacturer or owner 10 purchases or manufactures the item and chooses to register the unique item with the authentication system of this invention. Alternatively as discussed earlier, a business contracts with a celebrity or group of celebrities for a fixed number of autographs. The owner, the business or manufacturer also performs step 12 of associating a unique identifying code with each unique item or with each one of the one of a limited number memorabilia which uniquely identifies it. The owner also provides or enters his PIN or Personal Identification Number into the system via modem line 24 so that the PIN is also associated with the item as indicated by step 32 in the flow diagram of FIG. 2.

The authentication system or center 18 receives the unique identifying codes for each of the unique items and registers and archives the data at step 12 and associates the PIN at step 34 of FIG. 2. At a later time (hours, weeks or years), a buyer or purchaser 36 purchases the unique item after negotiating (double headed arrow 38 of FIG. 1) with the owner as indicated at step 40 of FIG. 2. The owner then accesses the system 18 via the website 26 as indicated by block 42 and calls up the unique item from memory 38 by providing the unique identifying code of the item and then releases or disassociates his PIN or Personal Identification Number from the item as indicated by block 44 of FIG. 2. Releasing the owner's PIN from the item unlocks the data and information associated with the item so that it can be changed. When the buyer is also a participating member of the website, the buyer will simply access the website and enter the identifying code that is unique to the item by the computer keyboard as indicated at step 46. Entering the code will result in the data associated with the unique item being displayed for study and review as shown in step 48. As shown at block 50, the new owner may add any selected purchaser information as desired since the original owner has unlocked the data. The new owner then locks the data which includes new data containing information regarding the new owner by associating the PIN or Personal Identification Number of the new owner with the unique item.

As shown the data related to each individual unique item including ownership history information is stored in the authentication system 18 and made available to the website 26 for display. The website users 52, 54, 56, and 58, as well as purchaser 36, may view the archived information concerning the unique item and stored by the authentication system or center and make offers to purchase any particular one of the archived unique items through the website or directly as has been discussed. If the offer is made through the website, the authentication system can then couple an output on line 24 to the owner 10 indicating that there is an interested potential purchaser in a particular unique item. The owner may then simply contact the potential purchaser and negotiate a sale.

Of course, as has been discussed, when the purchaser 36 is connected directly to the website 26 he may view all of the different unique items, some of which the purchaser may wish to acquire.

Thus, there has been disclosed a novel method and system for registering, authenticating, and archiving data representing unique items along with the ownership history of the item.

In addition, a purchaser can buy an item and a seller can sell an item as website user's wherein the website is coupled to the authentication system. Potential one of a limited number purchasers may view all of the particular unique items including one-of-a limited number memorabilia that has been purchased. As can be understood, if there is a set of 1000 units, the purchaser can learn that only 200 of the 1000 units, for example, have been purchased and registered. Thus, he can reasonably place a value on the purchased and registered memorabilia.

Further, as discussed, the authentication system utilized by the central clearing house insures that the purchased one-of-a-kind memorabilia is valid and not a counterfeit. With the printing and computer facilities available today, many unscrupulous persons counterfeit cards, plates, objects, and the like and sell them as part of a limited edition. With the unique identifying codes stored in the central clearing house, any purchased one-of-a-kind memorabilia can be determined to be valid or a counterfeit.

The corresponding structures, materials, acts, and equivalents of all means or step plus function elements in the claims below are intended to include any structure, material, or act for performing the function in combination with other claimed elements as specifically claimed.

I claim:

1. A method of updating registered ownership of unique items from a present registered owner to a subsequent registered owner in an authentication system comprising:
   receiving first unique data at said authentication system;
   associating said first unique data with said unique item;
   encoding and archiving said first unique data in said authentication system;
   receiving second unique data at said authentication system, said second unique data associated with said present registered owner;
   associating said second unique data with said unique item;
   receiving a change in registered ownership indication for updating registered ownership of said unique item at said authentication system;
   receiving third unique data at said authentication system, said third unique data associated with said subsequent owner;
   disassociating or releasing said second unique data from said unique item in response to said change in registered ownership indication; and
   associating said third unique data with said unique item in response to said third unique data being received.

2. The method of claim 1 and further comprising the step of archiving selected information associated with said updating of said registered ownership which information at least includes the names of the parties and the date of the ownership change by said authentication system to maintain a record of the historical ownership of said unique item.

3. The method of claim 1 wherein said authentication system requires the step of paying a fee prior to performing the step of associating said third unique data with said unique item.

4. The method of claim 1 and further comprising the step of providing a documented record of the change of registered ownership at least to the subsequent owner.

5. The method of claim 2 wherein said authentication system is accessed through a website and further comprising the step of making at least a portion of said selected information available to other users having access to said authentication system.

6. The method of claim 1 wherein said first unique data must be provided to said authentication system by said subsequent owner prior to said step of associating said third unique data with said unique item.

7. The method of claim 1 wherein said authentication system is accessed through a website by said present registered owner and said subsequent registered owner or their representative and wherein said second unique data is a PIN ("Personal Identification Number") associated with said present owner and said third unique data is a PIN associated with said subsequent owner.

8. The method of claim 1 further comprising the step of placing said encoded data representing said unique item on a magnetic strip associated with said unique item.

9. The method of claim 1 further comprising the stop of placing said encoded data representing said unique item in a bar code associated with said unique item.

10. The method of claim 2 further comprising the step of sending said selected information from said authentication system to a website for viewing by website users.

11. The method of claim 10 further including the step of enabling website users to purchase a authenticated memorabilia.

12. An authentication system for updating registered ownership of unique items from a present registered owner to a subsequent registered owner comprising:
   encoded first unique data associated with a unique item;
   an authentication center for receiving and archiving said encoded first unique data;
   second unique data associated with said unique item, said second unique data also associated with said present registered owner;
   third unique data associated with said subsequent registered owner; and
   a computer system at said authentication center for disassociating said second unique data from said unique item upon a specific request and in response to said second unique data being provided to said computer system, said computer system further associating said third unique data with said unique item subsequent to said second unique data being disassociated with said unique item upon request and in response to said third unique data being provided to said computer system.

13. The system of claim 12 wherein said second and third unique data are PIN numbers.

14. The system of claim 12 and further comprising an Internet website associated with said authentication center for accessing said computer system.

15. The system of claim 14 wherein said computer system archives said updated registered ownership and provides selected information concerning said updates to users having access to said computer system through said website.

16. The system of claim 12 further comprising a magnetic strip associated with a unique item for containing a unique identifying code.

17. The system of claim 12 further comprising:
   a bar code associated with said unique item for containing said unique identifying code.

18. The system of claim 12 further comprising:
   a website coupled to said central clearing house for enabling the display of information identifying a unique item to website users to enable website users to view all of said registered unique items.

19. A method of updating registered ownership of unique items from a present registered owner to a subsequent registered owner in an authentication system comprising:

associating first unique data with said unique item;

encoding and archiving first unique data in said authentication system;

associating second unique data with said unique item, said second unique data associated with a first owner of said unique item;

disassociating or releasing said second unique data from said unique item in response to a change in registered ownership indication;

associating third unique data with said unique item, said third unique data associated with a second owner of said unique item, wherein said first owner and said second owner are not concurrent owners; and tracking an ownership history of said unique item, said ownership history comprising at least an identifier for said first owner and said second owner.

20. The method of claim 19 above further comprises:

presenting one of said second unique data and said third unique data to said authentication system, wherein said second unique data is a first Personal Identification Number (PIN) and said third unique data is a second PIN; and accessing said ownership history in said authentication system.

* * * * *

UNITED STATES PATENT AND TRADEMARK OFFICE
CERTIFICATE OF CORRECTION

PATENT NO. : 6,591,252 B1
DATED : July 8, 2003
INVENTOR(S) : Steven R. Young

It is certified that error appears in the above-identified patent and that said Letters Patent is hereby corrected as shown below:

Column 1,
Line 61, delete "value it," replace with -- value, it --.

Column 3,
Line 62, after "and," and before "course," replace "or" with -- of --.

Column 4,
Line 21, replace "for providing" with -- to provide --.
Line 33, after "that" and before "available," replace "is" with -- are --.

Column 5,
Line 29, after "system" and before "releases," replace "an" with -- and --.

Column 6,
Line 34, replace "celebrity(s)" with -- celebrity(ies) --.
Line 35, replace "fan" with -- fans --.

Column 7,
Line 62, replace "perspective" with -- prospective --.

Column 9,
Line 2, replace "user's" with -- users --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,591,252 B1  Page 1 of 1
APPLICATION NO. : 09/438350
DATED : July 8, 2003
INVENTOR(S) : Steven R. Young It is certified that error appears in the above-identified patent and that said Letters Patent is hereby corrected as shown below:

Column 10
Line 58 - "said", should be --a--
--a website coupled to a central clearing house for--

Signed and Sealed this

Twenty-first Day of August, 2007

JON W. DUDAS
*Director of the United States Patent and Trademark Office*